United States Patent

Jansen

[11] Patent Number: 6,145,477
[45] Date of Patent: Nov. 14, 2000

[54] WALL-LESS ANIMAL CONTAINMENT SYSTEM

[75] Inventor: John Jansen, Brighton, Mich.

[73] Assignee: Jansen Laboratories, LLC, Brighton, Mich.

[21] Appl. No.: 09/254,756

[22] PCT Filed: Sep. 12, 1997

[86] PCT No.: PCT/US97/16365

§ 371 Date: Mar. 9, 1999

§ 102(e) Date: Mar. 9, 1999

[87] PCT Pub. No.: WO98/12914

PCT Pub. Date: Apr. 2, 1998

Related U.S. Application Data

[60] Provisional application No. 60/025,196, Sep. 12, 1996.
[51] Int. Cl.[7] .............................. A01K 1/00; A01K 31/12
[52] U.S. Cl. .................... 119/416; 119/468; 119/57.9; 119/452
[58] Field of Search ........................ 119/416, 429, 119/72, 430, 452, 469, 468, 459, 464, 475, 52.2, 52.3, 57.8, 57.9; D30/121, 127

[56] References Cited

U.S. PATENT DOCUMENTS

| | | |
|---|---|---|
| D. 68,941 | 1/1925 | Schwartz . |
| D. 81,960 | 9/1930 | Dickson . |
| 173,935 | 2/1876 | Ford . |
| D. 363,879 | 11/1995 | Krupa et al. .............................. D9/423 |
| 2,707,936 | 5/1955 | Kiehl . |
| 3,119,372 | 1/1964 | Gantz . |
| 4,009,686 | 3/1977 | Gilchrist . |
| 4,249,065 | 2/1981 | Malone ................................... 219/220 |
| 4,384,547 | 5/1983 | Mattox . |
| 4,552,093 | 11/1985 | Puckett ................................... 119/463 |
| 5,010,845 | 4/1991 | Azpurua et al. ........................ 119/452 |
| 5,275,126 | 1/1994 | Peterson . |
| 5,413,069 | 5/1995 | Currie ................................... 119/52.2 |
| 5,511,512 | 4/1996 | Pintavalli et al. . |
| 5,533,466 | 7/1996 | Kohus et al. ........................... 119/459 |
| 5,803,019 | 9/1998 | Heilborn et al. ........................ 119/475 |

Primary Examiner—Peter M. Poon
Assistant Examiner—Yvonne Abbott
Attorney, Agent, or Firm—Harness, Dickey & Pierce, P.L.C.

[57] ABSTRACT

A wall-less animal containment system for non-flying animals. The containment system includes a lower enclosure (24) that defines a generally upward concavity from a center portion (44) to a rim (48) with a wall extending between the center portion (44) and the rim (48). The interior surfaces of the wall are sufficiently smooth to prevent the animals contained therein from gripping onto the wall and climbing out of the lower enclosure (25). A perch is (50",50') is located above the lower enclosure (24) to permit animals in the containment system to perch above the lower enclosure (24). A lower support (36, 120) extends from the lower enclosure (24) and spaces the perch (50", 50') above the lower enclosure (24). The lower support (36, 120) is located so as to be a distance away from the rim (48) of the lower enclosure (24) to prevent an animal from climbing from the support (36, 120) to the rim (48). A lamp assembly (60) which includes a bulb, is located above the perch (50", 50') and is directed downward thereon.

31 Claims, 7 Drawing Sheets

WALL-LESS ANIMAL CONTAINMENT SYSTEM

This application claims priority to U.S. provisional application Ser. No. 60/025,196 filed Sep. 12, 1996.

BACKGROUND OF THE INVENTION

It is commonly known that different captive animals, and specifically chameleons, are quite fragile and usually die from stress in captivity. In their captive environment, these animals need a variety of environments to simulate the various natural habitats which the animals use for daily body temperature regulation and survival. Exposure to the warmth of the sun and access to a moisture laden environment are two such habitats which are part of the daily ritual of most wild chameleons. Chameleons are thermoregulatory animals and each species has its own preferences as far as specific temperature and humidity optimums in their daily routine. The animals themselves know their optimums and adjust their daily routine to adapt to the changing conditions present in their natural environment. Since different pet owners have different temperatures and humidity levels in their own homes, it is important to keep captive animals, such as chameleons, in a terrarium or vivarium that will provide the animals with a variety of habitat options, thus allowing the chameleon or its owner to compensate for the temperature and humidity variations that exists in the owner's homes.

Experts have also found that the number of perches, as well as the angle of the perches, is extremely important to a captive chameleon's survival. While vertical branches are used by chameleons to climb from one place to another, they make poor perches and can lead to high stress levels. Providing a plurality of perches of varying angularity is desirable.

Currently, captive chameleons and other small animals are generally kept in aquariums and cages. Aquariums and cages are consistent with current terrarium and vivarium technology and are compatible with decor such as waterfalls, mosses, sticks, plants, artificial plants, rocks, artificial rocks, bark and other materials. Aquariums and cages also are generally compatible with a variety of plant and animal care instruments (including drip emitters, waste collection reservoirs, aquarium pumps and filters, heat lights, feeding dishes, pots and other plant and animal husbandry tools).

While aquariums and cages adequately contain animals and plants, there are problems inherent with them. For example animals often receive injuries from contact with vertical walls in aquariums and cages. Other problems include stress to the animal from being confined by physical barriers, stress in territorial species from constantly being exposed to their own reflection in glass enclosures.

Obviously, there is a need for a low stress animal containment system that provides multiple environmental conditions and different perching options while still allowing viewing of the animals and plants therein.

BRIEF DESCRIPTION OF THE INVENTION

Accordingly it is an object of the present invention to provide an animal containment system which is non-stressful to the animal and also escape proof.

It is a further object of the invention to provide a versatile containment structure easily adaptable to provide multiple environmental conditions to satisfy all the needs of chameleons in captivity.

An additional object of the present invention to provide a wall-less container that is safe for the animals contained therein.

It is another object of the invention to provide an animal containment system which is also compatible with a variety of plant and animal care instruments and accessories including water, light, heat and food sources.

In accomplishing the above objects, the present invention is a wall-less animal containment system, particularly adapted for chameleons but also suitable for other animals, including an upper enclosure, lower enclosure and means for connecting the two. The enclosures are designed to hold both animals and plants and to prevent the animals from climbing out of the containment system. The enclosures are compatible with a variety of different animal and plant care instruments including water drip systems, lighting systems, food supply and waste collection reservoirs, as well as decor including waterfalls, sticks, vines and rocks.

The wall-less animal containment system of the present invention is designed to either hang from the ceiling or be supported on a surface and provide an unobstructed view of the animals and plants therein. The design is versatile allowing the user to alter the configuration of the containment system using different mechanisms for connecting the enclosures or other components, different means for maintaining the position of the enclosures or other components, and by adding different accessories and additional containers.

The containment system includes at least one enclosure which can be made of plastic, metal, or wood, or any suitable material, and which can be of any shape, circular, oval, square, hexagonal, octagonal, triangular, rectangular, etc., provided that when forming a bottom of the system, the enclosure has a wall angle steep enough (relative to the smoothness of its surface) to prevent a desired animal from crawling up the rim of the enclosure. If provided with a top enclosure, the top enclosure needs to be substantially large so the retained animal can not climb onto the rim of the top enclosure from the mechanism connecting the upper enclosure to the other components. If the rim itself is smooth and wide, chameleons will not be able to grip onto it and the size of the top enclosure can be reduced somewhat. The mechanism supporting the various enclosures must also hold the enclosures a distance apart, either in a hanging configuration or with stiff supports rising up from the bottom enclosure, to prevent climbing from one enclosure.

Additional benefits and advantages of the present invention will become apparent to those skilled in the art to which the present invention relates from the subsequent description of the preferred embodiment and the appended claims, taken in conjunction with the accompanying drawings.

DESCRIPTION OF PREFERRED EMBODIMENT

As seen in the attached drawings, one embodiment of the wall-less animal containment system of the present invention comprises an upper enclosure assembly, a lower enclosure assembly and means for connecting these two components. The preferred embodiment is a hanging system 20. The hanging system 20 includes an upper enclosure 22, a lower enclosure 24, as well as a middle assembly 26 and connecting mechanism for connecting and maintaining the position of the components relative to one another. The mechanism for connecting the components in the preferred embodiment includes a rope system (as further described below).

The upper enclosure 22 is preferably a circular, concave plastic dome or member 28 which may be at best described as substantially bowl shaped. The upper enclosure 22 domes downwardly from its center 30 before terminating in a rim 32. The rim 32 of the upper enclosure 22 is smooth, rounded, and wide enough to prevent chameleons, or other captive animals, from gripping the rim 32 or sides of the dome 28 and crawling on top of the upper enclosure 22 and escaping.

The upper enclosure 22 is suspended from a ceiling by a hanger 34 that extends upwardly from the dome 28. A series of ropes 36 are extended through holes 38 spaced between the rim 32 and the center 30 of the upper enclosure 22 with the ends of each rope 36 being passed through a hole 38 in the upper enclosure 22. The opposing ends of each rope 36 hang below the upper enclosure 22. Preferably, four ropes 36 extend down from the upper enclosure 22. While discussed as having four ropes 36, three could be utilized and one or more of the downward extensions of rope 36 could be unitarily connected to one another as opposed to being individual strands. The ropes 36 are adjusted to have an equal and adequate length below the upper enclosure 22. As an alternative to ropes 36, other suitable means for connecting the components of the present invention include rope-like items such as twine, yarn, cloth, wire and chain.

At the point immediately below where the ropes 36 pass through the dome 28 of the upper enclosure 22, clips or nylon fasteners (not shown) are placed on the ropes 36 to prevent slippage of the upper enclosure 22 down the ropes 36. The clips also assure that the upper enclosure 22 remains balanced and level with the ground. Alternative mechanisms for alternatively maintaining the position of the upper enclosure 22 (and other components as discussed below) include glue, pins, clamps or other fasteners capable of preventing slippage of the enclosure along the connecting ropes 36. These clips and alternative mechanisms can even be eliminated from the present invention if knots are tied in the ropes 36 below the upper enclosure 22.

Figure 1:
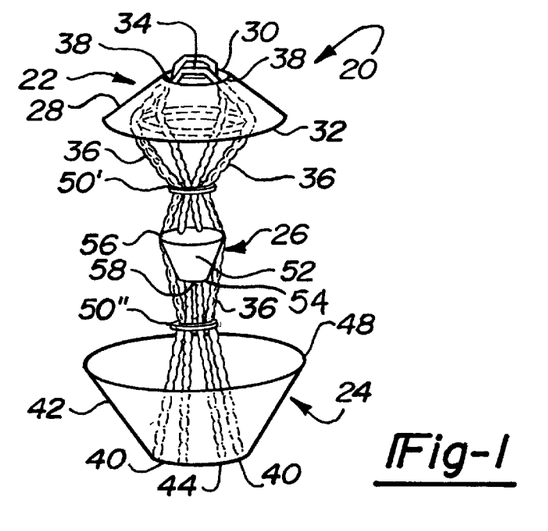
FIG. 1 is a diagrammatic illustration of a wall-less animal containment system according to the principles of the present invention.
Figure 2:
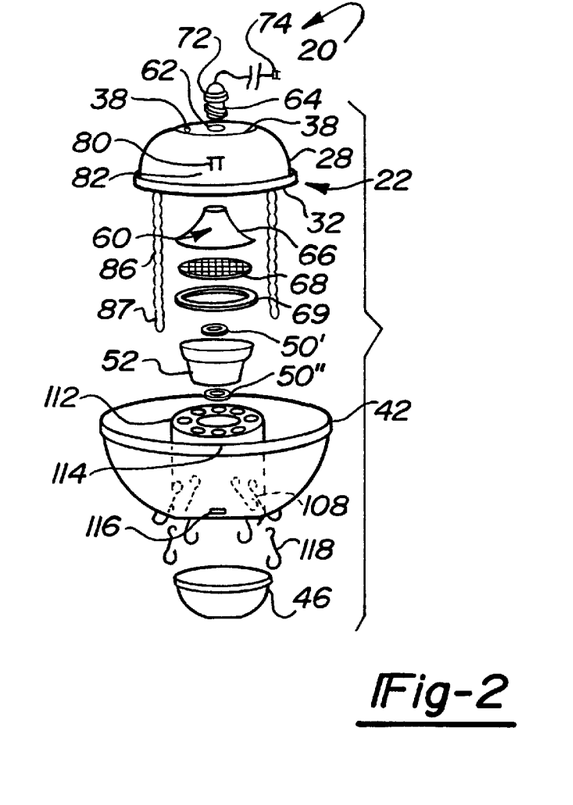
FIG. 2 is an exploded illustration similar to that of FIG. 1 illustrating a wall-less animal containment system according to the principles of the present invention.

Attached to the bottom of the ropes 36 below the upper enclosure is the lower enclosure 24. Accordingly, four holes 40 are formed in an inverted dome 42 of the lower enclosure 24 at equal increments around its center 44 and the ropes 36 are passed through the holes 40, clipped or knotted. The lower enclosure 24 consists principally of the inverted dome 42, but preferably also includes a collection reservoir 46 (as seen in FIG. 2). In the preferred embodiment, the inverted dome 42 is a large concave plastic bowl-like member with a flat bottom or center 44. The sides of the dome 42 angle or curve upward between the flat bottom 44 and a rim 48. The inner sides of the lower enclosure are substantially smooth and steep so as to prevent chameleons and other captive animals from gripping the sides, crawling out of the lower enclosure 24 and escaping. The rim 48 of the lower enclosure 24 is also smooth and rounded.

Because the holes 38, 40 in the upper and lower enclosures 22, 24 are located apart from the rims 32, 48 and generally toward the centers 30, 44 of the enclosures 22, 24, the ropes 36 are spaced a sufficient distance from the rims 32, 48 of the enclosures 22, 24 to prevent chameleons or other crawling animals from reaching the rims 32, 48 from any point on the ropes 36. In order to further space the ropes 36 from the rims 32, 48 of the upper and lower enclosures 22, 24, metal rings 50' and 50", ties or other ropes 36 can be placed collectively around all the ropes 36, at locations between the upper and lower enclosures 22, 24, to draw the ropes 36 centrally inward toward one another and away from the rims 32, 48.

The stability of the lower enclosure 24 is dependent on the location of the holes 40 and the ropes 36 that suspend it. The holes 40 and ropes 36 must be balanced from the center 44 of the lower enclosure 24 as well as from each other. If the ropes 36 are placed too close to the center 44, the enclosure 24 will easily tip to one side. Placing the holes 40 and the ropes 36 too close to the rim 48 allows chameleons and other captive animals to escape. The lower enclosure 24 can also be used to house and prevent the escape of a live food supply, such as insects.

Between the upper and lower enclosures 22, 24 and supported by the ropes 36, the preferred embodiment contains a middle assembly 26. The middle assembly 26 consists of various features for the animal to perch upon. As such, the middle assembly 26 may only include sticks (not shown) and other added materials. However, it is preferred to also include a container 52 such as a pot.

In one preferred embodiment, the pot 52 is made of plastic and has a closed bottom 54 and four evenly spaced holes 56 in its rim 58. The pot 52 is suspended with the open end facing up and the ropes 36 extending through the holes 56. The rings 50' and 50" mentioned above have a substantially smaller diameter than the rim 58 of the pot 52 and are located above and below the pot 52 and allow the pot 52 to be suspended some distance directly between the upper and lower enclosures 22, 24. The configuration of the ropes 36 through the rings 50' and 50" and pot 52 create an hour glass shape out of the ropes 36. Friction from the ropes 36 holds the rings 50' and 50" between the enclosures 22, 24 and the middle assembly 26. To hold the pot 52 level to the ground, clips, fasteners or knots (not shown) are used similarly to those associated with the upper and lower enclosures 22, 24.

In an alternative embodiment, a small pot (not shown) is located within a large pot 52. The gap between the pots allows a user to place branches and sticks in the gap, with the sticks extending upward and outward from the gap. This provides a stable climbing platform for chameleons and also adds a natural decor that complements the beauty of the animal's environment. Obviously, artificial branches, molded out of plastic or other materials, could also be used.

Figure 3:
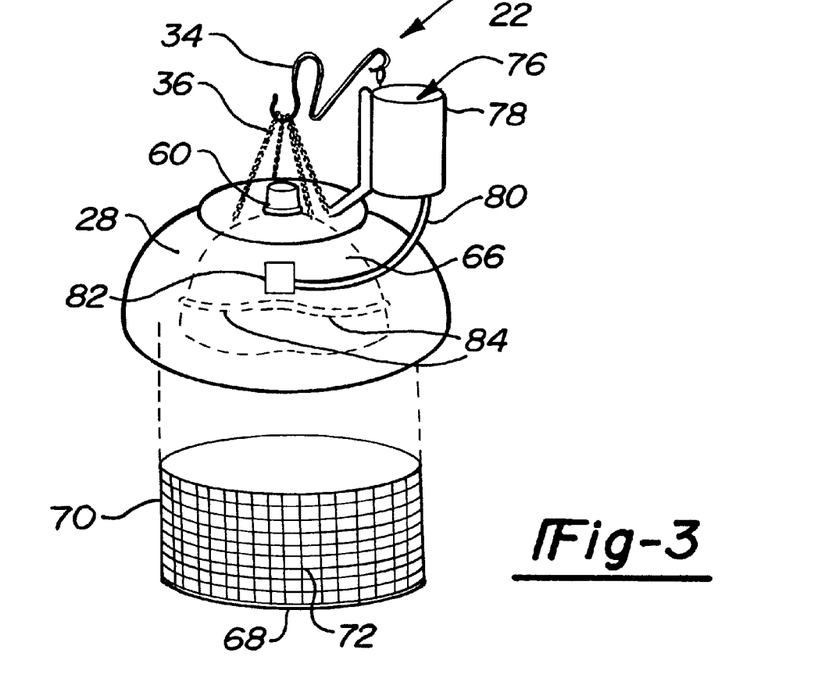
FIG. 3 is an exploded perspective view of the top assembly seen in FIGS. 1 and 2.
Figure 12:
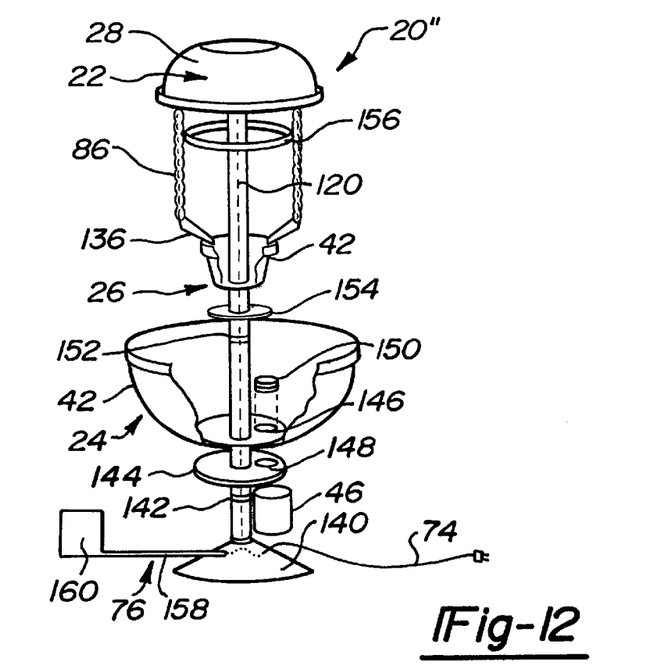
FIG. 12 is a partially cut-away perspective view of a further embodiment of a floor/table mounted wall-less animal containment system according to the principles of the present invention.

As a heat and light source for the containment system, one or more light assemblies, generally designated at 60 in FIG. 2, is fitted in an appropriately sized aperture 62, centrally located in the upper enclosure 22. The light assembly 60 includes a socket 64 having exterior threads on an end which protrudes inside the upper enclosure 22. A circular reflector 66, with threads corresponding to the exterior threads on the socket 64, can be attached to the socket 64 and located inside of the upper enclosure 22. Preferably, the rim of the reflector 66 is of a diameter smaller than the rim of the upper enclosure 22. The light socket 64 also contains interior threads for receiving a light bulb (not shown). A color corrected light bulb for reptiles is preferred and is screwed into the socket 64. To prevent the animals from contacting the bulb, in the preferred embodiment a circular piece of PVC coated hardware cloth or other screen material of the same diameter as the reflector 66 is attached to the rim of the reflector 66 and operates as a light cover 68. A protective ring 69 can be attached to the cover 68 to prevent the animals from climbing between the cover 68 and the reflector 66 and to conceal any sharp edges on the cover 68. Additionally, a cylindrical heat shield 70 of the same material as the cover 68 can be located around the reflector 66. This is seen in FIG. 3. The light assembly 60 also includes an easily accessible on/off switch 72, either located on the outside of the upper enclosure 22 or on an electrical cord 74 running from the light assembly 60 to an electrical receptacle. Another variety of the light assembly is generally seen in FIG. 12 and is further discussed below.

An additional feature of the containment system is a water drip system 76 which includes a conventional drip bottle 78 and water output tube 80. The bottle 78 is hung from the hanger 34 which supports the containment system 20 and the water output tube 80 connects to a valve 82 and Y-connector, having one intake and two outputs.

Preferably the valve 82 is located outside of the upper enclosure 22 for easy access while two output lines 84 from the valve 82 extend through one or more openings in the upper enclosure 22. Plastic vines 86 can be located on opposite sides of the upper enclosure 22, several inches up from the rim 32 and the water output lines 84 positioned to allow water droplets 87 to pass onto the plastic vines 86 where it will travel down to the lower ends of the vines 86 which are preferably located in the pot 52 of the middle assembly 26. In that animals such as chameleons do not recognize standing water, this dripping action is required.

Other water drip systems 76 are also compatible with the present wall-less containment system 20 and these include an automatic drip emitter system (not shown) which eliminates the need for a drip bottle 78. The components of an automatic drip emitter system include a clean water reservoir, a waste container, and an air pump, all of which are located on the floor some distance below the containment system 20. Air is pumped into an air tight container that is full of clean water and a flexible plastic tube (attached to the clean water reservoir) fills with water as air pressure increases in the reservoir. A tube runs upward from the container to the top of the containment system 20. If desired, the tube can be run up through the containment system 20 and secured to the support ropes 36 by an appropriate mechanism. Since the tubing can be provided in a clear variety, the tubing will not be apparent to the viewer if attached to the rope 36 with fasteners such as fine wire ties or fishing line. The tube is then connected to a valve 82 in the upper enclosure and the water drops 87 are distributed as described earlier.

Figure 6:
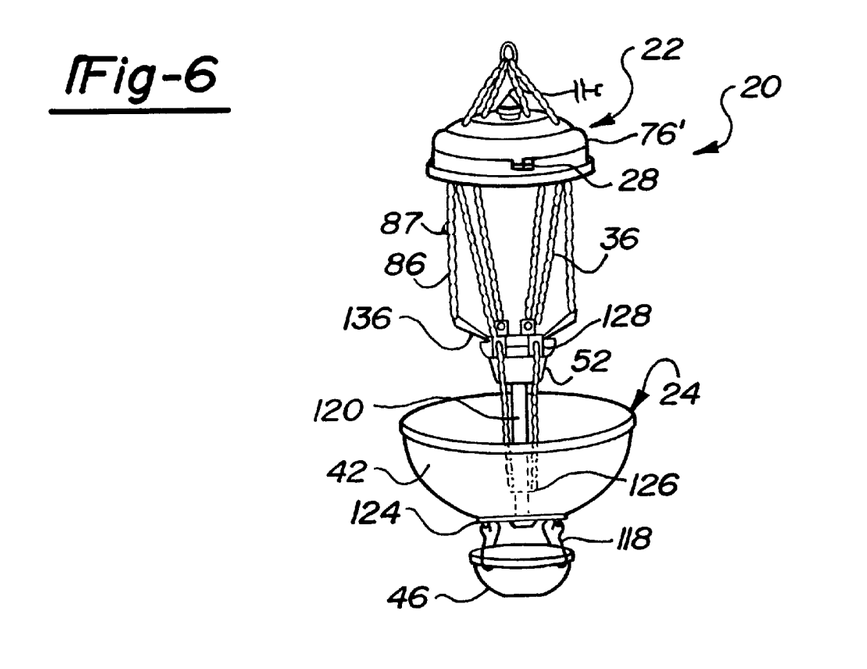
FIG. 6 is a perspective view of an alternative embodiment of the present invention.
Figure 14:
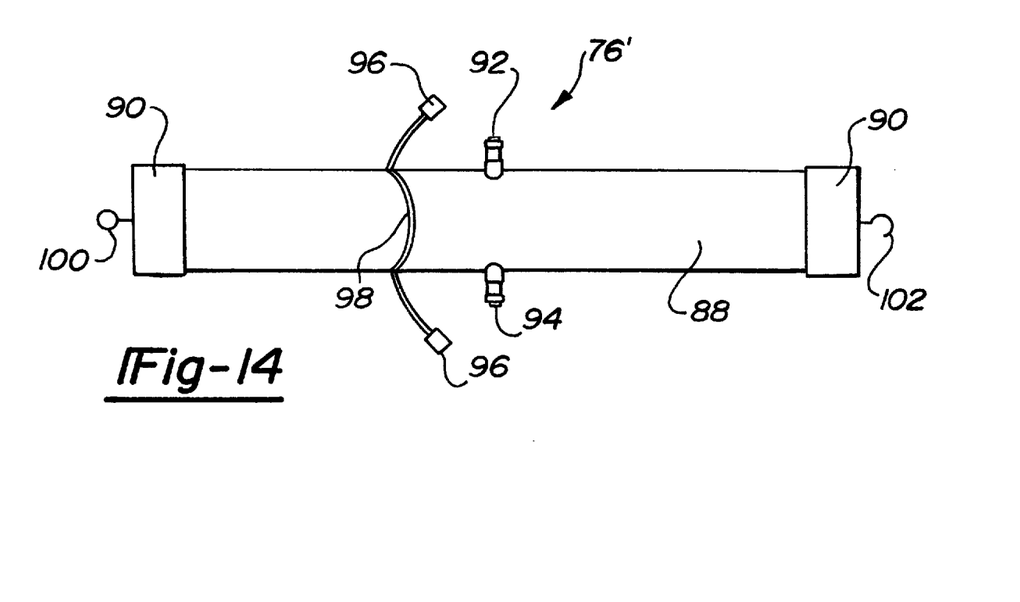
FIG. 14 is a diagrammatic illustration of a water container for a drip system according to aspect of the present invention.

As further seen in FIG. 14, another alternative drip system 76' is illustrated therein. This system 76' as outlined below, is designed to be less intrusive to the viewer of the containment system 20 and unbalance the containment 20 as it hangs from the hanger 34. More specifically, the drip system 76' includes a flexible tube 88 for containing water. The tube is flexible enough to be formed into a circle and laid on top of the dome 28. End caps 90 fit snugly onto the ends of the flexible tube 88 and are removable allowing water to be filled into the flexible tube. The end caps 90 are such that they provide a water tight seal with the flexible tube 88 preventing water from leaking out the ends of the flexible tube 88. An air intake nozzle 92 is provided into the flexible tube 88 and this air intake nozzle facilitates the flowing of water out through a water outlet nozzle 94. The nozzles 92 and 94 are also adapted to receive nozzle caps 96 to prevent water spillage when filling the flexible tubing 88 or locating the drip system 76' on the containment system 20 of the present invention. Additionally, a lanyard or other retaining means 98 can be secured to the nozzle caps to prevent them from being lost. Attached to one end cap 90 is an eye hook 100 and to the other end cap is an open ended eye hook 102. The open ended eye hook 102 can be engaged with the eye hook 100 when flex tube 88 is bent into a circular shape. In this shape, the drip system 76' can be supported on the dome 28 of the upper enclosure 22 (as seen in FIG. 6). By removing the nozzle cap 96 associated with the air intake nozzle 92, the dripping of water droplets 87 down the vines 86 can be initiated. To stop operation of the drip system, the nozzle cap 96 associated with the air intake nozzle 92 is simply replaced back onto the nozzle 92.

In addition to preventing chameleons and other captive animals from escaping, the lower enclosure 24 is also designed to funnel droplets 87 from the vines 86 into the mentioned collection reservoir 46 which is located immediately below the lower enclosure 24.

A removable plug (not shown) can be provided in the bottom of the collection reservoir 46 and its removal exposes an aperture through which water can be drained via an attached tube (not shown). The other end of the tube can be a waste collection container (not shown) located below the containment system 20. The collection container is capable of holding the same volume of water as the water reservoir or drip bottle 78. Water is thus flowed from the clean water reservoir down the plastic vines 86 where it drips into the collection reservoir 46 of the lower enclosure 24 which in turn channels the water into the collection container on the floor. Periodically the clean water reservoir will need to be refilled and the waste collection container emptied. A large capacity drip emitter system 76 and 76' is beneficial because it can water the system on a regular basis for weeks without any intervention by the user and it operates to clean the containment system.

As briefly mentioned above, the upper and lower rings 50' and 50" pull the ropes 36 inward and draw the ropes 36 away from the rims 32, 48 of the upper and lower enclosures 22, 24, helping to keep chameleons from reaching the rims 32, 48 of the enclosures 22, 24 while allowing them to crawl on the ropes 36. Thus, the required diameter of the rims 32, 48 of the enclosures is dependent on the reach of the chameleons and the location of the ropes 36. By incorporating the rings 50' and 50" and bringing the ropes 36 away from the rims 32, 48 of the enclosures 22, 24, smaller diameter domes 28, 42 can be successfully used in the system 20.

The upper and lower rings 50' and 50" also serve a number of purposes in addition to those mentioned above. One additional purpose is to provide non-vertical perches for chameleons. They also help to prevent high stress levels caused by access to only vertical perches in single type environments. The upper and lower rings 50' and 50" angle the ropes 36 converting them from vertical pathways to suitable perches giving the chameleons a number of perches located in a variety of environmental conditions. For example, as the upper ring 50' alters the path of the ropes 36 exiting the upper enclosure 22, it angles them in front of the light reflector 66. The angled rope 36 provides a perch directly below the light creating a "sunny" and warm environment which is necessary to a chameleon's survival. Chameleons will also perch on the ropes 36 below the pot 52 where it is cool and moist. This is a second environmental condition critical for chameleon survival.

Figure 4:
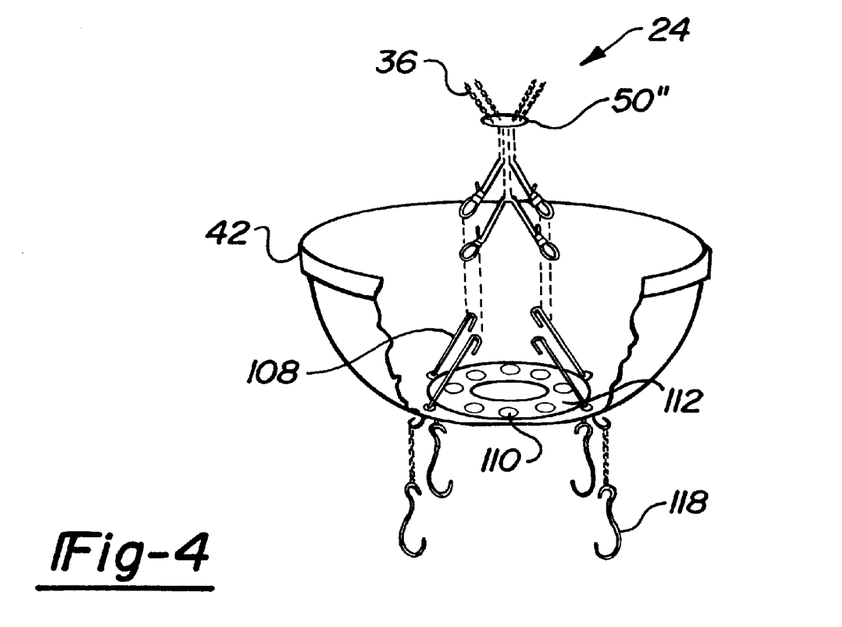
FIG. 4 is a cut-away exploded view of the lower enclosure assembly seen in FIG. 1.
Figure 5:
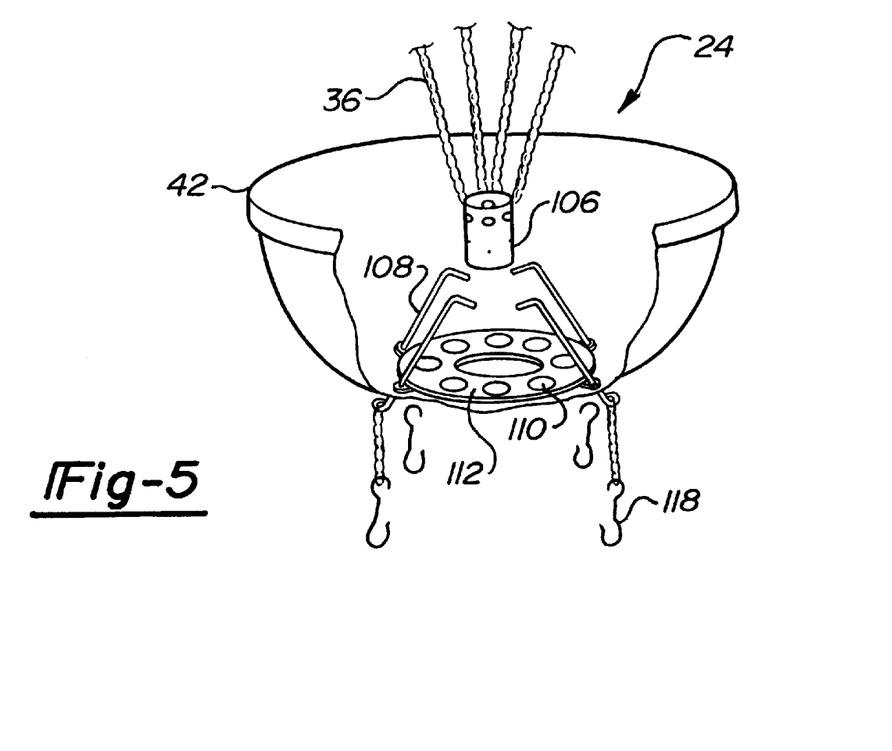
FIG. 5 is a cut-away exploded view of an alternative embodiment of the lower enclosure assembly seen in FIG. 4.

To assist in preventing the escape of the feeder insects or other small jumping animals, as briefly mentioned above, a small cone (not shown) can be mounted centrally on each of the support ropes 36 (as seen in FIG. 4) some distance above the lower enclosure 24 but below the lower ring 50". With the open end of such a cone facing down, this configuration prevents crickets or other feeder insects from climbing up the ropes. If allowed to climb to a higher location, such as the middle assembly 26, feeder insects that jump can sometimes clear the rim 48 of the lower dome 42 and escape. This feature need not specifically be cone shaped. It could be a flat disk, a parabola or other shape that prevents the desired animal from climbing up the ropes. Additionally a smooth material may be wrapped around the ropes eliminating the need for the cones altogether. For example, scotch tape or a similarly smooth material, wrapped around a support rope in place of the small cone, will prevent crickets from climbing up the support rope. They can not grip the smooth surface of the tape.

As a further alternative for maintaining feeder insects off of the ropes 36, the lowermost end of the ropes 36 can be secured to the upper portion of a cylinder 106, made of a smooth material on which the feeder insects cannot climb. The lower portion of the cylinder is provided to permit engagement with support hooks 108 which allow the cylinder 106 to support the dome 42 of the lower enclosure 24 therebelow.

In the bottom of the lower enclosure's dome 42 are a number of drain holes 110 spaced circumferentially about the center. Also in the dome 42 is a valving mechanism for draining the lower enclosure 24. In the preferred embodiment, the valving mechanism is a rotatable plastic disk or ring 112. The disk 112 is the same diameter and shape as the center of the lower enclosure 24 and is placed over the center portion, which may be a flat bottom. The disk 112 contains apertures corresponding with the drain holes 10 and can be provided with a handle or lever 14 extending outward from the disk 12 through an elongated aperture 116 in the lower enclosure 24. By manually rotating the disk 112 via the handle 114, the user is able to rotate the disk 112 causing the apertures to align with the drain holes 110 and allowing water and other matter to pass through the drain holes 110, out of the lower enclosure 24 and into the collection reservoir 46 located therebelow. A loose fit between the disk 112 and lower enclosure 24 can be provided to allow water to pass through the drain holes 110 even when the disk 112 is closed. This allows dripping water to pass, but keeps crickets and other feeder insects trapped in the lower enclosure.

The collection reservoir 46 is a removable small bowl-like structure slightly larger in diameter than the flat center of the lower enclosure 24. The reservoir 46 is mounted directly below the lower enclosure 24 with its open end facing up and is easily removable from the system 20. There are may ways of making the reservoir 46 removable. Various clips, hooks and other fasteners 118 such as Velcro, screws, string or magnets can be used to attach the reservoir 46 directly to the bottom of the lower enclosure or to the ends of hooks 108 supporting in the lower enclosure 24. For example, if the rim of the reservoir 46 contains equally spaced notches of the proper dimensions, the knotted ends of rope exiting the lower enclosure 24 can be placed in the notches enabling the reservoir 46 to rest on the ends of the ropes. When the collection reservoir 46 fills with waste and water, it is therefore easily removed and its contents are discarded.

To clean the wall-less animal containment system 20 of the present invention, the disk 112 is rotated periodically and the user sprays water on the inside of the lower enclosure 24 to wash droppings and various other debris into the collection reservoir 46. After this cleaning is complete, the disk 112 is rotated closed and feeder insects can be released into the system 20.

While in the preferred embodiment the means for draining the lower enclosure include a disk 112, other mechanisms can also be used that open and close an aperture or hole 110 in the dome 42 of the lower enclosure allowing passage of debris into the collection reservoir 46.

Figure 7:
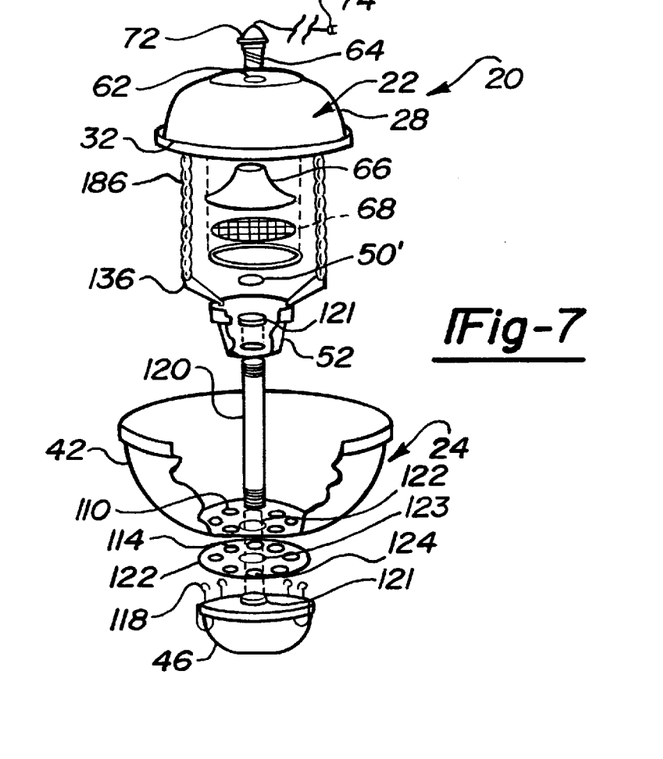
FIG. 7 is a cut-away exploded view of the embodiment illustrated in FIG. 6 with the support ropes having been omitted.

Another embodiment of the hanging variety of the wall-less animal containment system 20 of the present invention is illustrated in FIGS. 6 and 7. Elements which are common between the previously discussed embodiment and the present embodiment are being given like element numbers in the interest of clarity. The present embodiment generally differs from the previous embodiment in that the middle container 52 or pot supports the lower enclosure 24 not by the ropes 36, but rather by a rigid post 120. One end of the post 120 is attached to the pot 52 while the opposing end of the post 120 is attached to the bottom of the dome 42 of the lower enclosure 24. To provide for these attachments, the upper and lower ends of the post 120 can be threaded allowing for threaded fasteners to be received onto the posts 120, on the opposite sides of the pot 52 and dome 42. In securing the lower enclosure 24 to the post 120, the post 120 can be provided with a fixed position ring 122 (seen in FIG. 7) which has a plurality of apertures 124 located therein. In this embodiment, the dome 42 of the lower enclosure 24 can be allowed to freely rotate relative to the post 120 permitting the draining of water and other debris into the collection reservoir 46. In such an embodiment, the collection reservoir 46 can be supported by hooks 118 where at least some are integrally or unitarily formed with the ring 122.

Since the ropes 36 do not support the lower enclosure 24, ropes 36 can terminate at the pot 52 or they can hang down therefrom, as seen in FIG. 6, as a means for chameleons to climb down to the lower enclosure 24. Preferably, the ends of the ropes 36 in such an embodiment terminate as designated at 126 above the bottom of the dome 42 to prevent feeder insects from climbing up thereon and out of the dome 42. To allow for the adjustable positioning of the pot 52 and lower enclosure 24 relative to the upper enclosure 22, adjustment clips 128 are provided to slidably engage along the rope 36. The adjustment clips are seen in FIGS. 8 and 9.

Figures 8A, 8B, 9A, 9B:
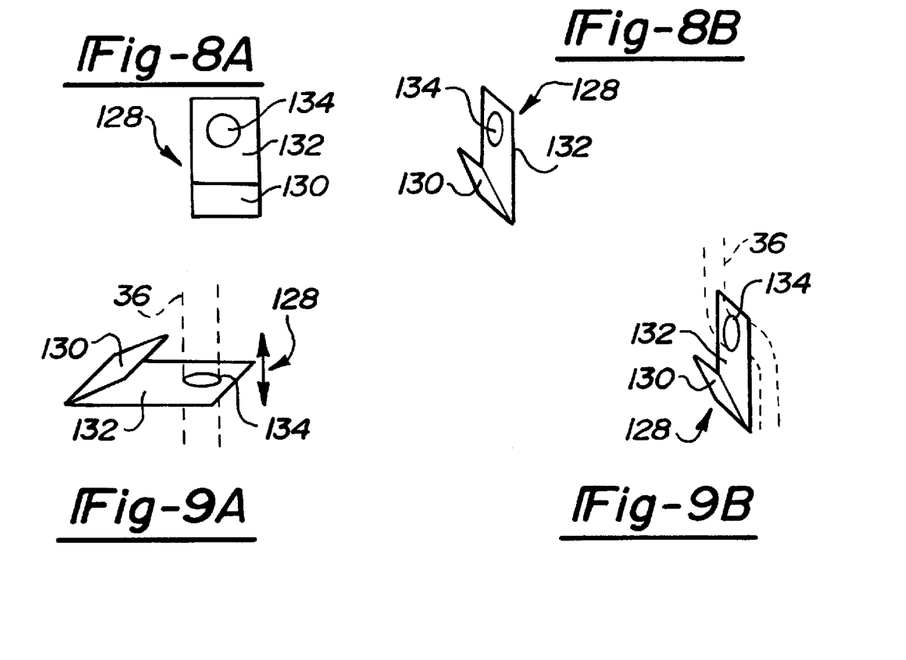
FIGS. 8a and 8b are respectively front and perspective view of the adjustment clips utilized in the embodiment of FIG. 6.
FIGS. 9a and 9b are diagrammatic illustrations of the interaction of the adjustment clips of FIGS. 8a and 8b with the support ropes.
Figure 10:
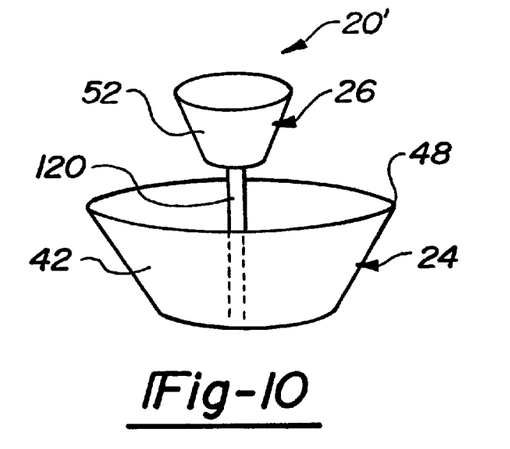
FIG. 10 is a perspective illustration of a floor/table mounted embodiment of the present invention.
Figure 11:
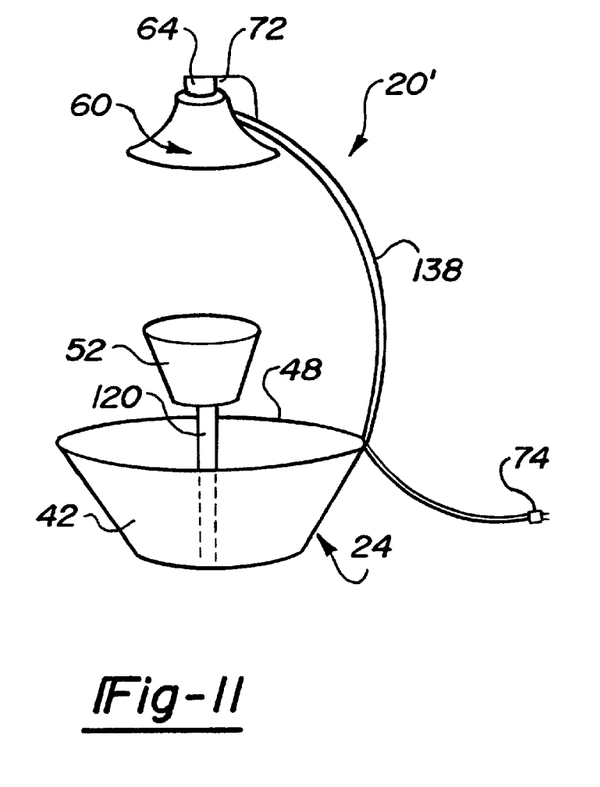
FIG. 11 is an alternative embodiment of a floor/table mounted wall-less animal containment system according to the principles of the present invention.

As seen in FIG. 8, the adjustment clip 128 includes a lower hook portion 130 which is designed to engage the rim on the pot 52. Extending upward from the hook portion 130 is a shank portion 132 in which is defined by an aperture 134. As seen in FIGS. 9a and 9b, the rope 36 extends through this aperture 134 and when the clips 128 are generally axially aligned with the ropes 36, a frictional engagement occurs between the clips 128 and the ropes 36 preventing the sliding of the ropes through the apertures. As a result, the clips 128 lock into place on the ropes 36.

As also seen in FIG. 6, the ends of the vines 86 may be provided with a drip leaf 136 which operates as a funnel or channel to direct water droplets 87 into the pot 52 where they subsequently drain into the dome 42 of the lower enclosure 24.

Non-hanging or table-top embodiments of the present invention are seen in FIGS. 10, 11, 12 and 13. The version of the containment system 20' seen in FIG. 10 includes a bowl-like lower enclosure 24 as described above. A support post 120 extends upward from the center of a dome 42 of the lower enclosure 24 and a middle assembly 26, including a pot 52, is mounted to the top of the support post 120. The middle assembly 26, post 120 and lower enclosure 24 may be as generally previously described in connection with FIGS. 6 and 7. As with the previous embodiments, the support post 120 is located a distance from the rim 48 of the lower enclosure's dome 42 so as to prevent a chameleon from reaching the rim 48 from the post 120 and climbing out of the containment system 20'.

Since the containment system of this embodiment is non-hanging, there is no need for the top enclosure.

To support a light assembly 60 above the middle assembly 26, a light fixture support 138 preferably arcs from the lower enclosure 24 up to a location immediately above the middle assembly 26. The arc or curve of this support 138 must be sufficient to locate the support 138 where it will be inaccessible to chameleons from the middle assembly 26. Obviously this support 138 can be constructed of any suitable material.

Referring now to FIG. 12, an alternative embodiment of a floor/table supported wall-less containment system 20' according to the principles of the present invention is generally illustrated therein. Again, elements common to the prior embodiments are designated with common references. This embodiment, particularly has elements in common with those embodiments seen in FIGS. 6 and 10. In this particular embodiment, the post 120 extends through the bottom of the dome 42 of the lower enclosure 24 terminating in a stand 140 which supports the post 120. A collar 142 is secured to the post 120 a distance above the stand 140 and a support disk or ring 144 is prevented from moving down the post 120 by the collar 142. Preferably, the support ring 144 is fixed relative to the post 120 to prevent relative rotation. It is also preferred that the collar 142 is adjustably positionable along the length of the post 120. This in turn will allow for vertical adjustment of the location of the lower enclosure 24 since the bottom of the lower enclosure 24 is supported on the support ring 144. In this embodiment, the lower enclosure 24 is also permitted to rotate relative to the post 120. Rotation of the dome 42 allows for alignment of an aperture 146 in the bottom of the dome 42 with an aperture 148 formed in the support ring 144. By aligning the apertures 146 and 148, water and debris flowing out of the lower enclosure 24 can be collected in a collection reservoir 46. The collection reservoir 46 can be attached to the post 120 by clips, clamps, ropes or other attachment mechanisms and can also be seated on the stand 140 if the stand 140 is shaped to receive the reservoir 46.

A removable screen cup 150 engages the aperture 146 in the bottom of the lower enclosure 24. The screen cup 150 allows water to pass out of the lower enclosure 24 and into the collection reservoir 46 and may also be completely removed to allow for more thorough cleaning of the system 20". Additionally, the screen cup 150 prevents feeder insects from escaping through the aligned apertures 146 and 148 during cleaning or if the apertures 146 and 148 are continuously left in aligned position. Position the post 120 above the lower enclosure 24 is an upper collar 152 and an upper support ring 154. The upper collar 152 and upper support ring 154 operate in a manner analogous to the collar 142 and support ring 144 mentioned above so as to support the pot 52 of the middle assembly 26 on a post 120.

As mentioned above, the post 120 extends upward through the bottom of the middle assembly 26 to a location above the middle assembly 26. The upper end of the post 120 engages an upper enclosure 22 through a removable engagement to support the upper enclosure 22 thereon. In addition to a light assembly 60 as previously described, this embodiment further illustrates the incorporation of a circular fluorescent light tube 156 being suspended from the upper assembly 22. The mechanisms for supporting the fluorescent light tube 156 may be those which are commonly utilized in the lighting industry. To provide electricity to the light assembly 60 and the fluorescent light tube 156, the cord 74 extends up through the post 120 to the light assembly 60 and fluorescent light tube 156.

In a similar fashion to the cord 74 of the light assembly 60, a drip system 76 may be incorporated into the containment system 20 by providing for a delivery tube 158 to extend up through the post 120 from a water reservoir/water pump 160. The pump itself can be of a variety of designs including an electrical pump or a hand pump.

Figure 13:
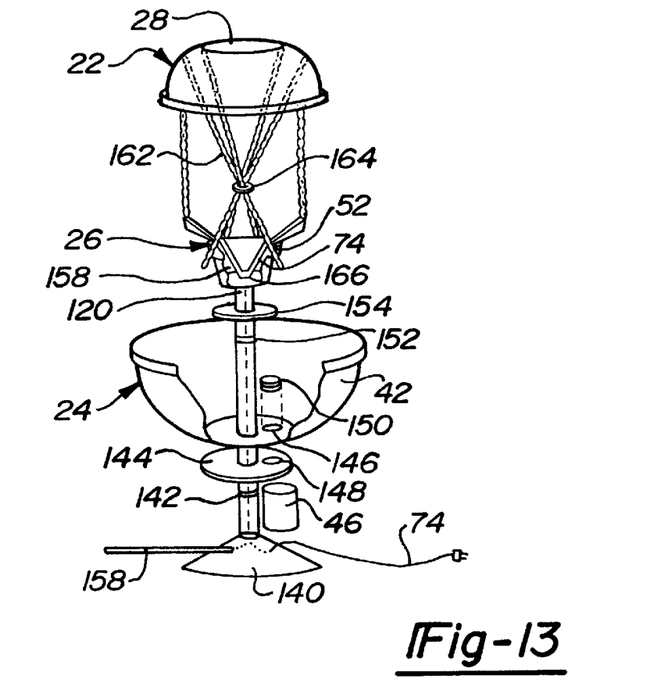
FIG. 13 is a cut-away perspective view of yet another floor/table mounted wall-less animal containment system according to the principles of the present invention.
Figure 15:
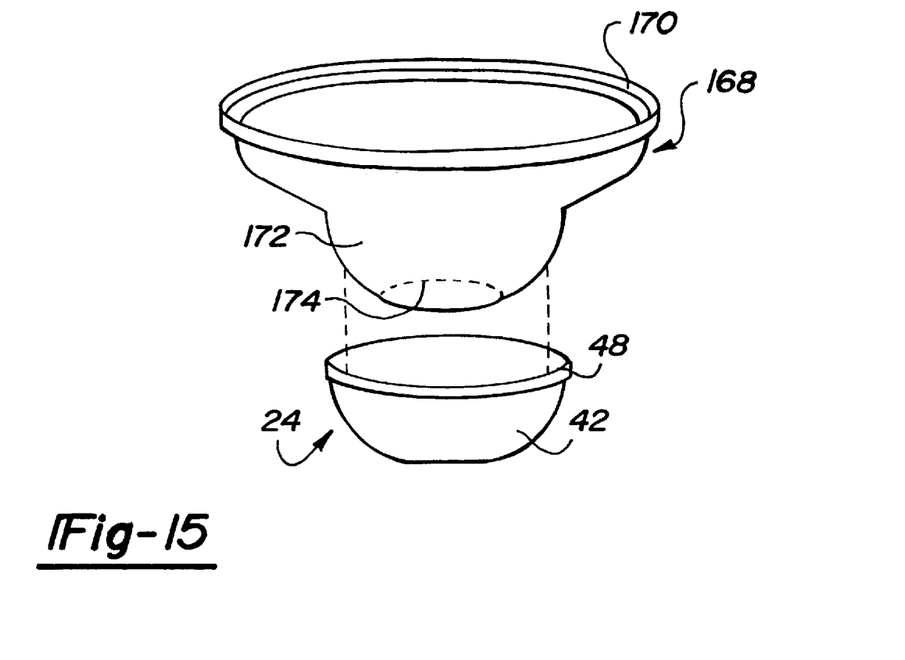
FIG. 15 is a exploded perspective view of a perimeter expanding bowl according to another aspect of the present invention.

The embodiment seen in FIG. 13 is similar to that seen in FIG. 12 except that a different support structure is provided for the removable dome 28 of the upper enclosure 22. In this embodiment, multiple support rods are mixed in generally diagonally up from the rim of the pot 52 so as to engage the dome 28 and support it thereabove. Apertures or recesses (not shown) can be formed in the pot 52 to engage the lower ends of support rods 162 and similarly recesses or apertures (not shown) can be formed in the dome 28 of the upper enclosure 22. Alternatively, clips, clamps, hooks and other attachment mechanisms can be used to secure the support rods 162 with either the pot 52 or the dome 28 of the upper enclosure 22. Because the support rods extend diagonally upward from the pot 52, a portion of each of the support rods will be adjacent to one another at an area located above the middle assembly 26. The support rods can be binded together by a binder 164 at this location. Additionally, the cord 74 and water supply tube 158 can be attached to one or more of the support rods 162 to generally conceal them from causal observation. Also illustrated in this embodiment is a threaded nut 166 which threadably engages an upper end of the post 120 at a point inside of the middle assembly 26 so as to securely retain the pot 52 on the post 120. Another aspect of the invention is generally illustrated in FIG. 15. Since chameleons can vary widely in size and since chameleons are often purchased when they are young and small, any of the embodiments of the present invention can be provided where the containment system 20 includes a reduced diameter dome 42 for the lower assembly 24. As the chameleon grows, it will be desirable to increase the diameter of the dome 42 of the lower enclosure 24. Seen in FIG. 15 is a bowl 168 configured to be nestably received within the reduced diameter dome 42 of the lower enclosure 24. The bowl 168 includes an upper rim 170 which defines a diameter greater than the diameter of the dome 42 of the lower enclosure 24. A portion of the bowl 168, generally the central or bottom portion 174, is shaped so as to correspond with the inner shape of the dome 42. Shaped as such, the bowl can be received into the dome 42, firmly resting therein. To ensure proper cleaning of the bowl 168, an opening 174 is defined in the reduced size portion 172. The opening 174 generally corresponds in size to the bottom of the dome 42 and is such that it does not occlude or inhibit any of the drain holes or rotating rings of the prior embodiment.

While the above description constitutes the preferred embodiment of the present invention, it will be appreciated that the invention is susceptible to modification, variation and change without departing from the proper scope and fair meaning of the accompanying claims.

I claim:

1. A wall-less animal containment system for non-flying animals, said containment system comprising:
   a lower enclosure, said lower enclosure defining a generally upward concavity from a center portion to a rim with a wall extending between said center portion and said rim, interior surfaces of said wall being smooth to prevent animals contained within said containment system from gripping onto said wall and climbing out of said lower enclosure;
   perch means located above said lower enclosure for permitting animals in said containment system to perch thereon above said lower enclosure;
   a lower support extending up from said lower enclosure, said lower support spacing said perch above said lower enclosure, said lower support being located a distance away from said rim of said lower enclosure and preventing an animal from climbing from said support to said rim; and
   a lamp assembly including a bulb, said lamp assembly located above said perch means and being directed downward thereon.

2. The containment system of claim 1 wherein said interior surfaces of said walls of said lower enclosure are coated with a material providing a reduced friction surface relative to an uncoated interior surface of said walls.

3. The containment system of claim 1 further comprising an upper enclosure and upper support, said upper enclosure being located above said perch means by said upper support.

4. The containment system of claim 3 wherein said upper enclosure defines a generally downward concavity extending from a center portion to a rim with one or more walls extending between said center portion and said rim, said rim being spaced apart from said upper support preventing animals contained within said containment system from gripping onto said upper enclosure and climbing out of said containment system.

5. The containment system of claim 4 further comprising hanging means extending from said upper enclosure for hanging said containment system from there above.

6. The containment system of claim 3 wherein said upper support is one selected from the group of rope, wire, cable, or chain.

7. The containment system of claim 6 wherein said lower support is one selected from the group of rope, wire, cable, or chain.

8. The containment system of claim 6 wherein said lower support is a post, said post being retainingly engaged with said lower enclosure and said perch means.

9. The containment system of claim 3 wherein said upper support and said lower support are posts.

10. The containment system of claim 3 wherein said upper support and said lower support is a single post.

11. The containment system of claim 10 wherein said post extends through a middle assembly.

12. The containment system of claim 11 wherein said middle assembly is adjustably positionable along said post.

13. The containment system of claim 11 further comprising a stand, said post extending through said lower enclosure and being secured to said stand for supporting said containment system on a support surface.

14. The containment system of claim 13 wherein said lower enclosure is adjustably positionable along said post relative to said stand.

15. The containment system of claim 3 wherein said lamp assembly is supported by said upper enclosure.

16. The containment system of claim 3 further comprising a water drip system providing moving water collecting in said lower enclosure, said drip system including a water source, open conveying means for conveying water along a route passing form adjacent to said upper enclosure generally adjacent to perch means and into said lower enclosure.

17. The containment system of claim 16 wherein said water source is a flexible tube having an air inlet nozzle, a water outlet nozzle, and closed ends, said water outlet nozzle being coupled to said open conveyor means.

18. The containment system of claim 17 wherein at least one of said closed ends is closed by a removable end cap.

19. The containment system of claim 17 wherein said water source includes connecting means for connecting said ends together forming said flexible tube generally into a ring.

20. The containment system of claim 19 wherein said water source extends generally circumferentially around said upper enclosure so as to be counter balanced thereon.

21. The containment system of claim 1 wherein a middle assembly is adjustably positionable relative to said lower enclosure.

22. The containment system of claim 1 wherein said bulb is a heat lamp.

23. The containment system of claim 1 wherein said bulb is a fluorescent bulb.

24. The containment system of claim 1 wherein lower enclosure includes portions defining at least one opening therein and closure means for selectively covering and uncovering said opening.

25. The containment system of claim 24 further comprising a collection reservoir located below said opening in said lower enclosure in a position to receive items passing therethrough.

26. The containment system of claim 25 wherein said reservoir is removeably attached to said lower enclosure.

27. The containment system of claim 1 further comprising anti-climbing means for preventing feeder insects from climbing said support.

28. The containment system of claim 27 wherein said anti-climbing means is a cylinder attached to said support.

29. The containment system of claim 27 wherein said anti-climbing means is a cone attached to said support.

30. The containment system of claim 1 further comprising a water drip system providing moving water collecting in said lower enclosure, said drip system including a water source, open conveying means for conveying water along a route passing generally adjacent to perch means and into said lower enclosure.

31. The containment system of claim 30 wherein said drip system includes a valve for selectively turning said drip system on and off.

* * * * *